(12) United States Patent
Biester

(10) Patent No.: US 7,934,437 B2
(45) Date of Patent: May 3, 2011

(54) ACTUATING DEVICE, ESPECIALLY FOR USE IN A THROTTLE DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 2002 days.

(21) Appl. No.: 10/415,418

(22) PCT Filed: Oct. 30, 2001

(86) PCT No.: PCT/EP01/12549
§ 371 (c)(1),
(2), (4) Date: Sep. 4, 2003

(87) PCT Pub. No.: WO02/065006
PCT Pub. Date: Aug. 22, 2002

(65) Prior Publication Data
US 2004/0056229 A1    Mar. 25, 2004

(30) Foreign Application Priority Data

Oct. 30, 2000    (DE) .................................. 200 18 563

(51) Int. Cl.
*F16H 27/02*    (2006.01)
*F16K 31/02*    (2006.01)

(52) U.S. Cl. ................................. 74/89.14; 251/129.11

(58) Field of Classification Search .................. 251/205, 251/129.11, 129.12, 19.13, 249.5; 74/89.14
See application file for complete search history.

(56) References Cited

U.S. PATENT DOCUMENTS

| | | | |
|---|---|---|---|
| 1,979,425 A * | 11/1934 | Van Der Woude | 310/112 |
| 2,860,266 A * | 11/1958 | Schrader | 310/112 |
| 3,616,884 A * | 11/1971 | Balz | 192/51 |
| 3,667,311 A * | 6/1972 | Wysong | 74/424.75 |
| 3,738,183 A * | 6/1973 | Ball et al. | 74/89.29 |
| 3,884,090 A * | 5/1975 | Dock | 74/424.92 |
| 4,366,833 A * | 1/1983 | Grotloh | 137/334 |
| 4,850,319 A * | 7/1989 | Imoehl | 123/361 |
| 4,971,099 A * | 11/1990 | Cyvas | 137/270 |
| 4,994,001 A * | 2/1991 | Wilkinson et al. | 475/4 |
| 5,113,824 A * | 5/1992 | Haubner | 123/399 |
| 5,224,512 A * | 7/1993 | Nogami et al. | 137/554 |
| 5,777,412 A * | 7/1998 | Yamamoto | 310/83 |
| 6,446,660 B1 * | 9/2002 | Goni Usabiaga | 137/243.6 |
| 2003/0167864 A1 * | 9/2003 | Biester et al. | 74/89.23 |

FOREIGN PATENT DOCUMENTS

| DE | 071.069 | 6/1996 |
|---|---|---|
| EP | 0 303 801 | 2/1989 |

* cited by examiner

*Primary Examiner* — Richard Ridley
*Assistant Examiner* — James Pilkington
(74) *Attorney, Agent, or Firm* — Conley Rose, P.C.

(57) ABSTRACT

The invention relates to an actuating device, especially for use in a throttle device, comprising a turning spindle rotatably mounted in the device housing. Said turning spindle is functionally linked via a transmission device with a drive device to displace an actuating element that is linked with the turning spindle. The aim of the invention is to provide an improved actuating device that is secure and has a simple design and that can be telecontrolled in a simple manner without major maintenance work, without losses of functionality of the actuating device and at reduced costs. To this end, the actuating device comprises at least two separately or synchronously operated motors and the transmission device has at least one self-locking transmission unit, said transmission unit being functionally linked with the two motors for turning the turning spindle.

41 Claims, 6 Drawing Sheets

ACTUATING DEVICE, ESPECIALLY FOR USE IN A THROTTLE DEVICE

BACKGROUND OF THE INVENTION

The invention relates to an actuating device, especially for use in a throttle device, comprising a turning spindle rotatably mounted in the device housing, the turning spindle being functionally connected via a transmission device with a drive device to displace an actuating element connected with the turning spindle.

In practice such actuating devices are known, for instance, in the fields of maritime or terrestrial oil or gas production. The actuating device is operated either manually or hydraulically. The actuating device varies the passage of a throttle so as to reduce the pressure of, for instance, oil transported from a crude oil source. The oil exits from the crude oil source under a pressure of several hundred bar, and the corresponding throttle device reduces this pressure to less than 100 bar.

In an actuating device known in practice a turning spindle rotatably mounted in the device housing can be displaced in an axial direction by means of a handwheel. The turning spindle is connected with an actuating element which influences the throttling in the throttle device. Normally, a transmission device is disposed between the handwheel and the turning spindle.

Moreover known from practice is an actuating device whereof the turning spindle is adjusted by a hydraulically driven drive device, wherein—in this case—the turning spindle may also be designed as part of piston/cylinder unit in which a piston can be displaced inside a cylinder housing by corresponding hydraulic pressure.

In view of such actuating devices it should be appreciated that the same are arranged in remote and/or difficult to access regions, e.g. below the sea level. A manual actuation, therefore, involves considerable efforts, is cost-intensive and dangerous for the operator. Furthermore, the manual adjustment of the actuating device is hard to cheek, and without enough precision. A hydraulically controlled actuating device requires a plurality of hydraulic lines, corresponding connections, sealing elements, pumps and the like for forming the entire hydraulic system. The work involved is increased with each additional actuating device likewise controlled and operated via the hydraulic system. The work involved is even more increased if the actuating device is located in regions subjected to high pressures, such as below sea level. Such hydraulically controlled and operated actuating devices moreover frequently have to be checked for leakages and the like, within the scope of which the entire hydraulic system including the entirety of supply and discharge pipes, connections, pumps and the like are checked for leakages.

Another drawback of such hydraulic actuating devices resides in that the efforts and the expenses for the exact control of the actuating device are very high.

As far as the manually as well as the hydraulically operated actuating devices are concerned it finally should be noted that the same have to be provided with special safety facilities, for example, for avoiding—in connection with the throttle device—an unintended opening of the throttle and, inter alia, a pressure drop in the hydraulic system. Otherwise, the entire production system could considerably be damaged if the oil, which is subjected to a high pressure, exits without being throttled.

BRIEF SUMMARY OF THE PREFERRED EMBODIMENTS

The invention is, therefore, based on the object to improve an actuating device of the aforementioned type such that the same is secure and simple in design, and that it can be remotely controlled in a simple manner without major maintenance work and without losses of functionality of the actuating device and at reduced costs.

In connection with the features of the preamble of claim 1 this object is provided in that the drive device comprises at least two individually or synchronously operable electric motors and the transmission device at least one self-locking transmission unit, said transmission unit being functionally connected with the two electric motors for turning the turning spindle.

Due to the electrical construction of the drive device corresponding hydraulic facilities such as hydraulic lines, pumps or the like can be waived. The actuating device, especially the electric motors, are fed and controlled via an electric cable. If the electric cable is correspondingly designed, it is sensitive to pressure and temperatures. A manual actuation of the actuating device, or frequent maintenance works by maintenance staff, are no longer required.

The actuating device can be controlled and monitored from a station located far away, so that corresponding control facilities in the proximity of the actuating device, such as on a drilling platform or the like, are not necessary. Instead, the corresponding facilities may be located on the mainland and far away from the actuating device.

The drive device of the actuating device according to the invention is constructed such that the electric motors can be operated alternatively, which provides for a redundant arrangement of the drive device. If an electric motor breaks down or is insufficiently active it may be replaced by the other one.

According to another operating type of the drive device both electric motors can also be operated simultaneously, whereby they are synchronized in their driving activity relative to the turning spindle. Thus, higher torques can be transmitted by the drive device.

Separate safety measures for preventing an unintended displacement especially of the actuating element or, respectively, of the turning spindle, and thereby an unintended interference with the throttle device, are—according to the invention—no longer necessary or, respectively, feasible due to the employment of the self-locking transmission unit. The self-locking state of the transmission unit entails that the same cannot be moved even by optionally large driving torques and that the driving torque is internally blocked by proportional frictional forces. The self-locking state can be released by actuating the drive device in that said drive device transmits a corresponding release torque to the transmission unit. In view of the throttle device, normally a self-locking in the opening direction of the throttle device is sufficient. It is, however, likewise possible to adapt the transmission device to be self-locking in both moving directions.

For allowing an easier monitoring especially of the speed and the torque of the electric motors, and for providing highly reliable and highly efficient motors, the electric motors may be constructed as servomotors, particularly direct current servomotors. Said servomotors do normally not comprise a brush.

For allowing the separate, or also the synchronous operation of the electric motors, and for continuing the redundancy of the drive device towards the outside, each electric motor may be electrically connected with a separate control device. As was mentioned above, said control device may be arranged far away from the actuating device.

For obtaining the redundancy also for the device housing and for the corresponding connecting lines, an electric connection for each electric motor may be provided in the device housing.

A self-locking transmission unit can be constructed in different ways. Known are, for instance, self-locking planet gears, ratchet gears or the like. A simply structured self-locking transmission unit may be seen in a worm gear pair comprising at least a worm and a worm gear, with the worm gear being associated with the turning spindle and the worm being associated with the electric motors.

For simply functionally connecting the worm with the electric motors, the worm may be located on a worm shaft being functionally connected with both electric motors. In this conjunction it can be regarded as a special advantage if, for instance, the electric motors are each functionally connected with opposite shaft ends of the worm shaft. It is likewise possible that both electric motors are arranged on the same side of the worm shaft and, in the axial direction thereof, one after the other.

A simple drive connection in an embodiment according to the invention can be seen in that each electric motor is connected via its motor shaft with the respective shaft end in a manner secured against rotation.

Alternatively it is also possible that each shaft end is arranged in one of the electric motors as motor shaft in a manner secured against rotation.

For mounting the worm shaft in a maintenance-free manner each shaft end can be rotatably mounted by ball bearings and/or roller bearings in the device housing.

The worm and the worm gear moreover allow an easy gearing and a transmission of a high torque. For obtaining an even higher gearing with more reliability, high loading capacity and long service life the transmission device may moreover be provided with a ball screw formed of at least one ball nut and the turning spindle as recirculating ball screw. For allowing an even better transmission of the load by such a thread, the transmission device may comprise a roller thread formed of at least one roller nut and the turning spindle as recirculating roller spindle.

For being able to waive a roller recirculation in the roller thread, the roller thread may be a planetary roller thread.

For being able to easily accommodate the thread nut, either the ball nut or the roller nut, in the device housing, the same may be arranged in a bearing shell mounted in the device housing in a rotatable, but axially undisplaceable manner. The thread nut may be held in said bearing shell in a positive, non-positive or frictionally engaged manner.

For being able to transmit the driving power to the thread nut from the worm gear pair in an easy manner, an end toothing may be arranged on at least one end of the thread nut, which is engaged with a toothing of the worm gear.

For allowing the use of as few components as possible in this connection, and for reducing the costs, the end toothing may be formed by the worm gear, whereby the same may directly be formed on the thread nut.

For facilitating the fabrication in this connection, the worm gear may, however, also be formed separately and detachably especially on the thread nut.

Different embodiments for the worm gear and the worm are conceivable. The worm gear may, for example, be a globoid worm wheel having a substantially concavely curved toothing on its external side. A spur-toothed wheel for the worm gear is likewise conceivable. Analogously, the worm may be formed as a cylindrical worm or as enveloping worm.

For being able to arrange the thread nut, and correspondingly the bearing shell, in the device housing in a manner secured against load, the bearing shell may be mounted in the device housing by means of at least one axial bearing.

For being able to actuate the actuating device according to the invention also without any electric power supply or, if it breaks down, at least in a case of emergency, at least one electric motor may be associated with an especially manually operable actuating device. Said actuating device acts on the electric motor such that the motor shaft thereof can be turned in the desired direction.

An embodiment of such an emergency actuating device may comprise a pintail spring-loaded in the direction of the ready position, which can be connected with the motor shaft at its end facing the electric motor in a manner secured against rotation. In the ready position the pintail is unengaged with the motor shaft, arid only by manually actuating and pressing the pintail against the spring load is the same approximated to the motor shaft with its end and connected with the motor shaft in a manner secured against rotation. The rotation-secured connection may, for instance, take place in that the end of the motor shaft facing the pintail has a corresponding cross-section which can be grasped by said facing end of the pintail in a positive manner.

For being able to actuate the emergency actuating device directly manually, the pintail may be passed through a bore of an outer wall of the device housing towards the outside in a sealed manner where an actuation end is provided. This may be a handwheel or the like. For being able to protect the drive device and the transmission device in the device housing against high pressure and other negative environmental influences, the device housing may comprise a central body of metal, especially of aluminum or an aluminum alloy, in the central bore of which the thread nut is mounted and along which extends the turning spindle. The central body may have a sufficiently thick wall allowing it to withstand corresponding high pressures. For being able to substantially accommodate also the electric motors in the central body, the central body may comprise two motor openings which are open towards the outside in a radial direction, in each of which an electric motor is detachably fastened, whereby a connection opening for accommodating the worm shaft and the worm extends between the motor openings and substantially tangential to the central bore. The connection opening may be formed in that the central opening is widened in the portion of the motor openings for accommodating the worm shaft and the worm. In this case, the connection opening substantially forms a part of the central opening.

For being able to easily arrange the corresponding devices and particularly the transmission device in the central body, the central body can be closable with an end plate at one end in a releasable manner.

A simple embodiment of a central body may be seen in that the same substantially has a cylindrical shape. For being able to protect the same, and possibly additional devices arranged on the end plate, against outer influences, the central body may be arranged with its end plate in a housing shell releasably closable on one end by a cover plate. For being able, if required, to transport the actuating device with or without the throttle device a lifting journal may stand out from an external side of the cover plate. This lifting journal can be gripped by a corresponding gripping tool on a crane, an underwater vehicle or the like so that the actuating device can be transported.

For being able to easily determine the position of rotation of the turning spindle relative to the thread nut from a remote position, a position sensor may be arranged substantially centrally in the end plate and allocated to one end of the turning spindle. Said sensor, particularly a linear position sensor, can detect the distance between the sensor and the end of the turning spindle and transmit the same via corresponding electrical lines.

If the actuating device according to the invention is provided for a throttle device it may be considered favorable that the central body and/or the housing shell are detachably fastenable on a throttle housing of the throttle device, whereby they can be fixed on the throttle housing from outside by means of their fastening ends unsealed by the end plate or cover plate.

For fastening the central body and/or the housing shell on the throttle housing screws can, for instance, be used which are directly screwed into the throttle housing or the central body or, respectively, the housing shell. It is likewise feasible that the housing shell comprises a shoulder on its fastening end facing in a radial outward direction, which can be gripped from behind by a shoulder protruding from a fastening ring in a radial inward direction. In this case, the fastening ring is directly screwed to the throttle housing.

For being able to apply the actuating element of the actuating device according to the invention substantially directly in connection with the throttle device, the actuating element may protrude over the open fastening end of the central body and may be pushed in a forward direction along a throttle element bore in the throttle housing right into a throttle space, with the throttle space connecting a fluid inlet arid a fluid outlet in the throttle housing. Thus, extensions for the actuating element in the throttle housing are not necessary. It is moreover regarded as an advantage if a throttle element for varying the fluid passage in the throttle space is arranged substantially on the free end of the actuating element. In this case the actuating device according to the invention directly comprises the throttle element, and more or less forms a throttle element adjustment means varying the fluid passage between the fluid inlet and the fluid outlet in the throttle space in response to the adjustment of the throttle element, i.e. in response to the position of rotation of the turning spindle.

Different exemplary embodiments are conceivable for such a throttle element. For example, a perforated passage sleeve or regulating sleeve may be disposed in the throttle space, onto which a throttle sleeve may be slipped as throttle element. In response to the slip-on degree onto the passage sleeve the throttle sleeve seals the holes thereof so that more or less fluid flows from the fluid inlet via the passage sleeve to the fluid outlet. If the throttle sleeve is slipped onto the passage sleeve as far as possible, the fluid inlet is normally completely closed in the direction of the fluid outlet.

The perforation in the passage sleeve may be realized by radial openings formed in the case thereof in different sizes and different patterns.

According to another exemplary embodiment of the throttle element the same may be formed as a sealing plug variably sealing a passage bore of the fluid inlet running into the throttle space. In response to the position of rotation of the turning spindle, the sealing plug can thereby more or less be displaced by the actuating element in the direction of the fluid outlet, and correspondingly more or less covers the passage bore of the fluid inlet. A simple allocation of the actuating element and the turning spindle may be seen in that both are arranged coaxially and are releasably connected with each other at their ends facing each other. The releasable connection allows, according to need, the application of a longer or shorter actuating element with possibly differing throttle elements in respect of the actuating device.

It had already been pointed out above that the electric motors can be operated individually or synchronously. The synchronization of the motors may be effected, for example, mechanically. Such a mechanic synchronization, however, requires the exact observance of process tolerances. A simplified synchronization may be seen in that the electric motors are synchronized by means of software and via their control devices.

In order to facilitate the synchronization control in this respect, one electric motor may be connected as master and the other electric motor may be connected as slave. A master/master combination is, however, also possible, or an adjustment with one motor only in a case of emergency.

For electrically connecting particularly the parts contained in the central body, electrical ducts may be arranged in the end plate.

For being able to relatively adopt at least the interior of the housing shell to a high ambient pressure, the device housing, or particularly the space between the central body and the housing shell, can be filled with oil and compensated. The compensation in this case particularly relates to an additional supply or withdrawal of oil from the device housing, in dependence on the temperature.

BRIEF DESCRIPTION OF THE DRAWINGS

Advantageous embodiments of the invention will hereinafter be explained in more detail by means of the figures shown in the drawings, wherein.

DETAILED DESCRIPTION OF THE PREFERRED EMBODIMENTS

Figure 1:
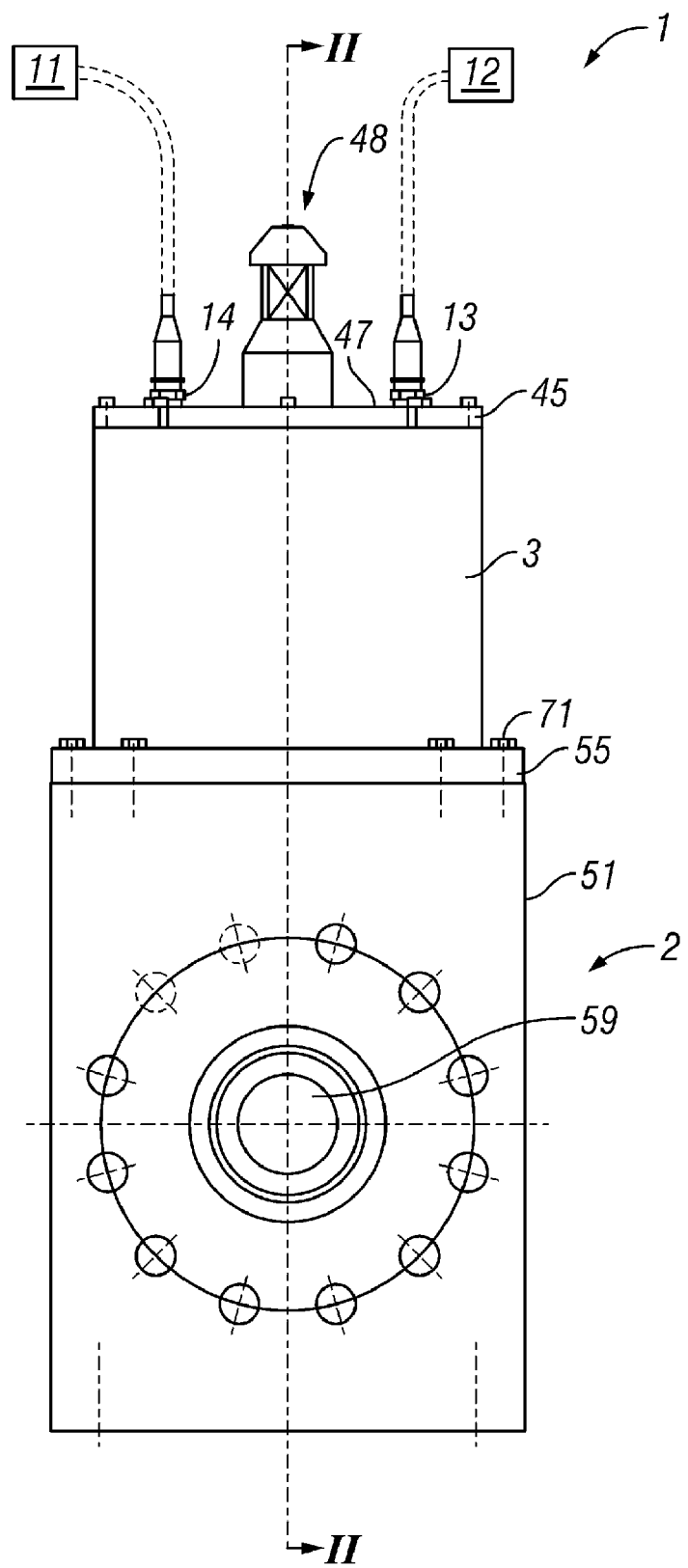
FIG. 1 shows a lateral view of an embodiment of an actuating device according to the invention comprising a throttle device from the side of a fluid inlet.

FIG. 1 shows a lateral view of an embodiment of an actuating device 1 according to the invention with a connected throttle device 2 from the side of a fluid inlet 59. The actuating device 1 is detachably fastened to a throttle housing 51 by means of a fastening ring 55 and a plurality of studs 71.

A corresponding device housing 3 of the actuating device 1 is tightly and releasably sealed by a cover plate 45 on its side facing away from the throttle housing 51. Two electrical connections 13 and 14 are provided in the cover plate 45, which are connected with remotely disposed control facilities 1, 12 by means of electrical connecting lines.

A lifting journal 48 protrudes from an outer side 47 of the cover plate 45 by means of which at least the actuating device 1 can be removed from or approximated to the actuating device 2 by a corresponding lifting tool such as a crane, a grappler or the like.

Figure 2:
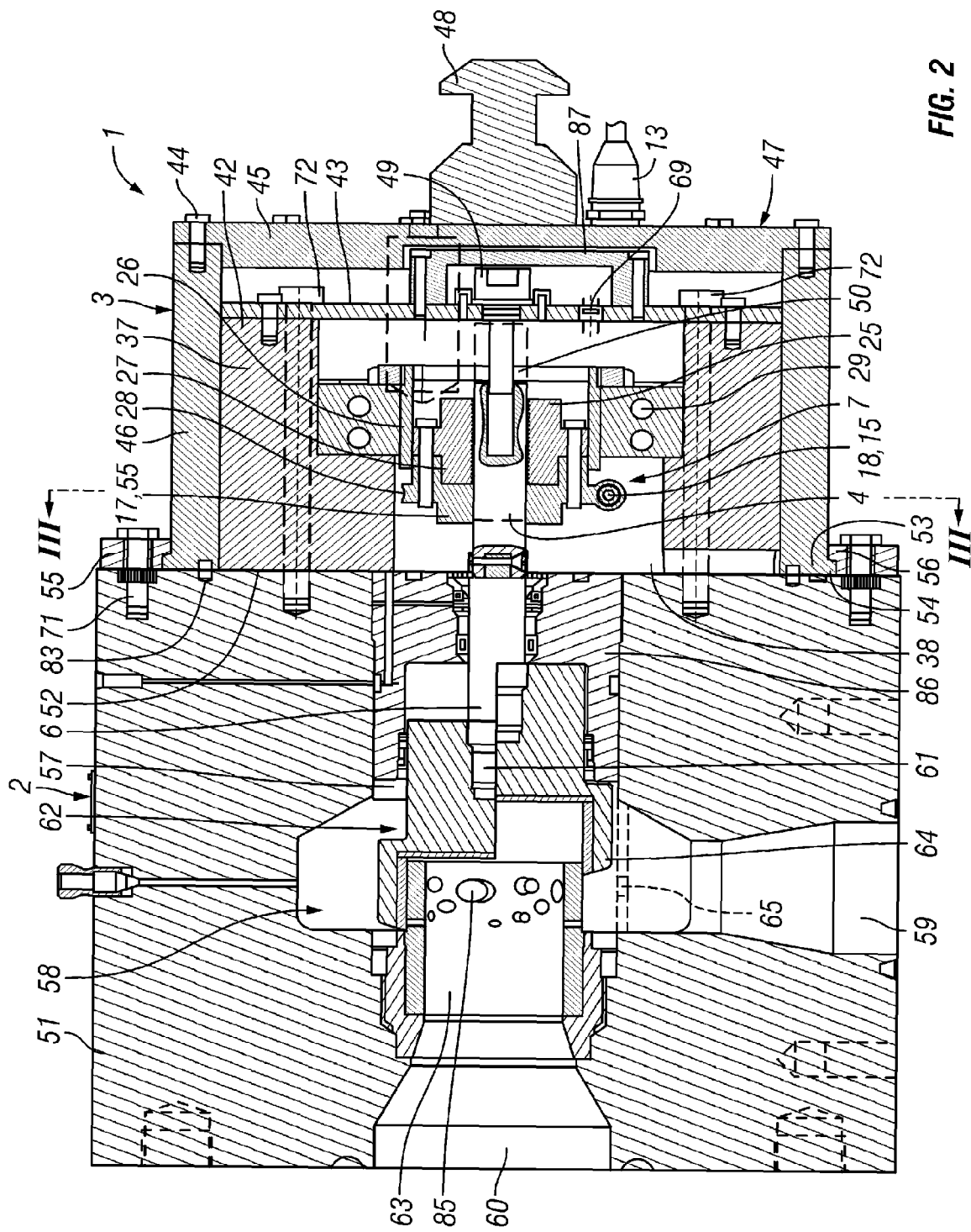
FIG. 2 shows a longitudinal section along line II-II from FIG. 1.

FIG. 2 shows a section along line II-II from FIG. 1.

The throttle device 2 comprises in its throttle housing 51 at least one fluid inlet 59 and one fluid outlet 60. If required, also several fluid outlets may be provided. A throttle space 58 is located between the fluid inlet 59 and the fluid outlet 60, in which a passage sleeve 63 having a number of passage openings 85 is arranged. Opposite the fluid outlet 60 extends a throttle element bore 57 in the throttle housing 51, in which a throttle element 62 is mounted so as to be displaceable in an axial direction.

FIG. 2 shows two extreme positions of the throttle element 62 formed as throttle sleeve 64. In the position of the throttle sleeve 64 shown in the lower half of FIG. 2 the same is withdrawn from the passage sleeve 63 as much as possible, so that all passage openings 85 are opened relative to the throttle space 58. In the position of the throttle sleeve 64 shown in the upper half of FIG. 2 the same is slipped onto the passage sleeve 63 as far as possible, so that—in this position—all passage openings 85 are covered and a communication between the fluid inlet 59 and the fluid outlet 60 is interrupted.

The throttle element 62 is detachably fastened at the free end 61 of an actuating element 6. The actuating element 6 extends along the throttle element bore 57 to a turning spindle 4. Ends 67, 68 of the turning spindle 4 and the actuating element 6 facing each other are releasably connected with each other by means of a screw 79 (also see FIG. 5). An intermediate sleeve 86 is arranged in the portion of the throttle element bore 57, through which the actuating element 6 is passed in a tight manner and in which the same is passed so as to be displaceable in an axial direction. On its side of the intermediate sleeve 86 facing the throttle space 58 the same is provided with an accommodation opening for the throttle element 62.

Via its device housing 3 the actuating device 1 is detachably fastened to the throttle housing 51 on the side of the outwardly running throttle element bore 57. The device housing 3 is formed of a central body 37 and a housing shell 46 enclosing the same. The housing shell 46 substantially is a hollow cylinder being tightly sealed by the cover plate 45 on one of its ends 44. The connection between the cover plate and the housing shell is accomplished by corresponding studs. On its fastening end 53 facing the throttle housing 51 the housing shell 46 comprises a radially outwardly protruding shoulder 54. In the fastening position of the actuating device 1 shown in FIG. 2 said shoulder 54 is gripped from behind by a shoulder 56 protruding radially inwardly from the fastening ring 55. The fastening ring 55 is detachably fastened to the throttle housing 51 by a plurality of studs 71 (also see FIG. 1).

For correctly aligning the device housing 3 relative to the throttle housing 51 a number of positioning pins 83 are provided, which protrude from the fastening end 53 at least of the housing shell 46 in the direction of the throttle housing 51.

A substantially, likewise cylindrically shaped central body 37 is disposed inside the housing shell 46, which comprises a central bore 38 approximately in the center thereof and a fastening end 52 facing the throttle housing 51. In the fastening state of the actuating device 1 shown in FIG. 2 said bore 38 communicates with the throttle element bore 57, and the turning spindle 4 can be displaced along said central bore 38 in a direction coaxial to the actuating element 6. The displacement of the turning spindle 4 is accomplished by rotating a thread nut 25 in which the turning spindle 4 is rotatably mounted as recirculating ball screw or recirculating roller spindle. The turning spindle 4 and the thread nut (ball nut or roller nut) form a part of a transmission device 7, via which the actuating element 6 is functionally connected, for adjustment purposes, with a drive device 5 along the throttle element bore 57.

The thread nut 25 is held in a bearing sleeve 26 in manner secured against rotation. The bearing sleeve 25 is rotatable via the axial bearing 29, but is held in an undisplaceable manner in the axial direction of the central bore 38. The axial fixation of the bearing sleeve 26 is effected by a threaded ring 80 (also see FIG. 5).

At one end 27 of the thread nut 25 facing the actuating element 6 an outer toothing 28 is arranged, which is formed by a worm gear 17 detachably fastened with the thread nut 25 by means of a stud 82. The worm gear 17 forms part of a worm gear pair 15 and engages with its toothing 28 a corresponding outer toothing of a worm 16 as additional part of the worm gear pair 15 (also see FIG. 3).

A position sensor 49 is allocated to an end 50 of the turning spindle 4 facing away from the actuating element 6. Said sensor 49 is arranged approximately in the center of an end plate 43. Said end plate 43 is detachably fastened at the end 42 of the central body 37 by means of a number of screws. The end plate 43 thereby closes the central bore 38 in the direction of the cover plate 45. The position sensor 49 is enclosed by a hood 87 being detachably fastened on one outer side of the end plate 43 and protruding into a corresponding recess on an inner side of the cover plate 45. An electrical duct 69 is arranged in the end plate 43 in the portion of the hood 87 and is enclosed by the latter.

Figure 3:
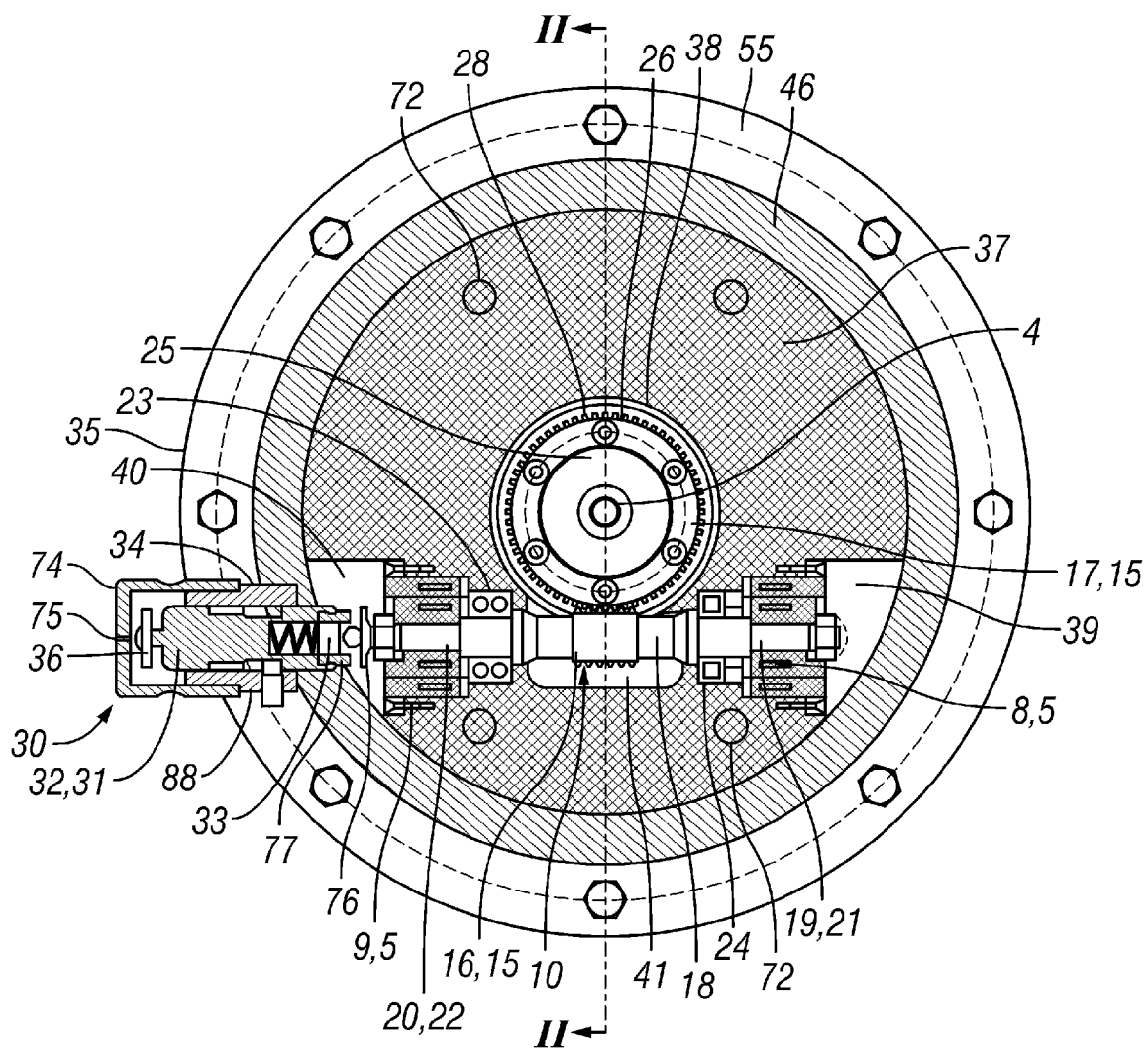
FIG. 3 shows a section along line from FIG. 1.
Figure 5:
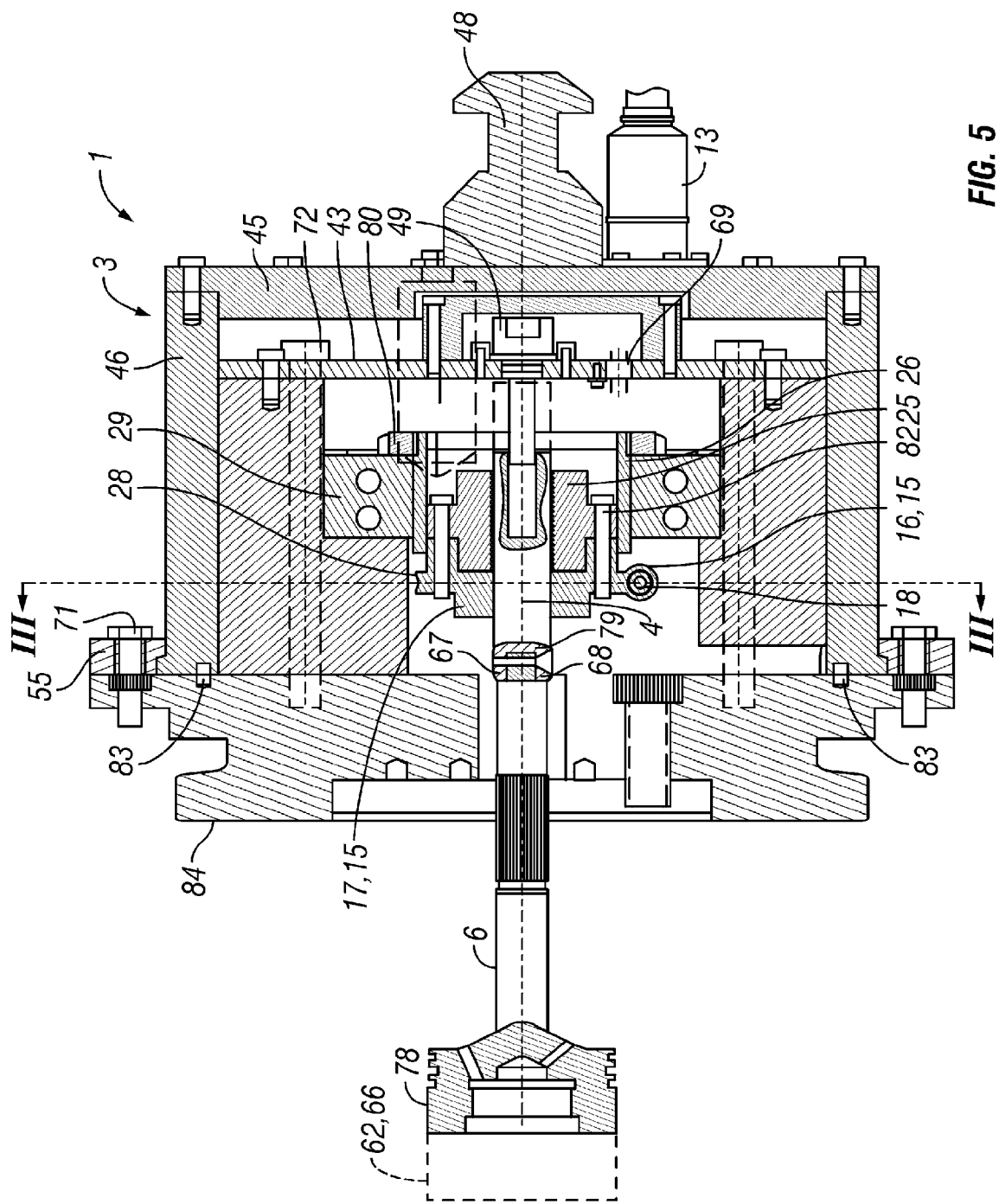
FIG. 5 shows a longitudinal section along line V-V from FIG. 4.
Figure 6:
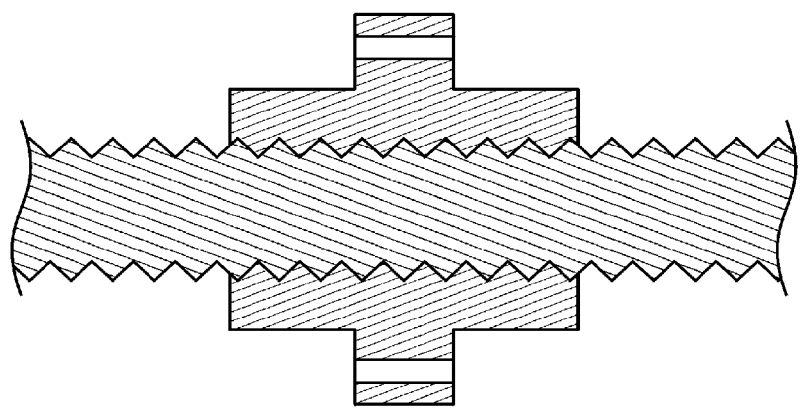
FIG. 6 shows a portion of a transmission device that includes a ball screw drive with a rotating ball nut and a recirculating ball screw.
Figure 7:
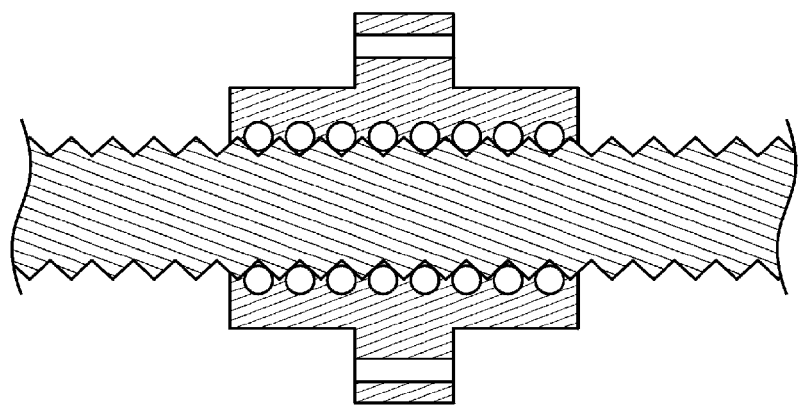
FIG. 7 shows a portion of a transmission device that includes a roller thread drive with a rotating roller nut and a recirculating roller spindle.
Figure 8:
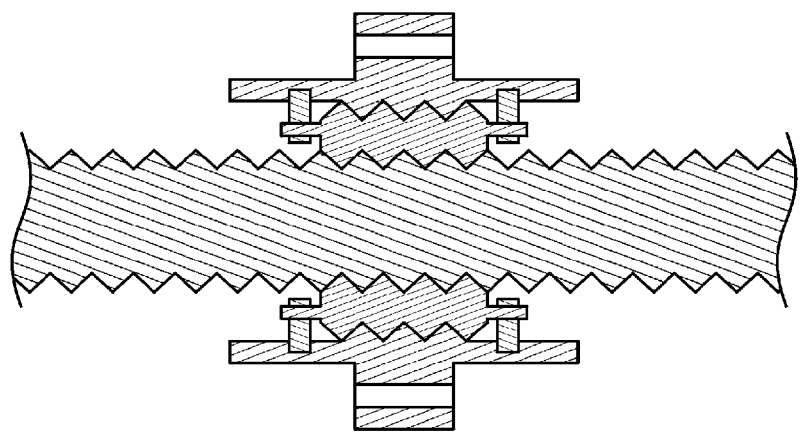
FIG. 8 shows a portion of a transmission device that includes a thread nut drive with a rotating thread nut and a threaded screw.

FIG. 3 illustrates a section along line III-III from FIG. 2 or also III-III from FIG. 5.

Identical parts in FIG. 3, and also in the other figures, are always provided with identical reference numbers and will partially be described only in connection with the figure.

Fastening ring 55, housing shell 46 and central body 37 are arranged concentrically, whereby the bearing sleeve 26, the thread nut 25 and the turning spindle 4 are likewise concentrically arranged in the central bore 38 of the central body 37.

The worm gear 17 in the exemplary embodiment according to the invention is formed by a globoid worm wheel, the outer toothing of which is engaged by a corresponding outer toothing of a cylindrical worm 16. The worm 16 is arranged as an additional part of the worm gear pair 15 on a worm shaft 18. The worm 16 and the worm gear 17 form a transmission unit 10 as part of the transmission device 7—also see turning spindle 4 and thread nut 25—whereby said transmission unit 10 forms a self-locking transmission unit.

By means of its two shaft ends 19, 20 the worm shaft 18 is releasably connected with electric motors 8, 9 forming a drive device 5 of the actuating device 1. The electric motors 8, 9 are servomotors, especially direct current servomotors. The shaft ends 19, 20 form, according to one embodiment, the corresponding motor shafts 21, 22. The free ends of the motor shafts 21, 22 protruding in the electric motors 8, 9 are held by nuts.

The electric motors 8, 9 are arranged in motor openings 39, 40 formed in the central body 37 and adapted to be open towards the outside. The motor openings 39, 40 are substantially arranged at both sides of the central bore 38 and outwardly offset to the same in a radial direction. A connection opening 41 is provided between the motor openings 39, 40 which extends approximately tangentially to the central bore 38.

As can be seen in FIG. 2 the connection opening 41 is formed radially outwardly by an expansion in the central bore 38.

The worm shaft 18 is, in the portion of its shaft ends 19, 20 and on the side of the electric motor 9, rotatably mounted by a ball bearing 23, and on the side of the electric motor 8 by a roller bearing 24. The electric motors 8, 9 are detachably fastened by screws or the like in the motor openings 39, 40.

In the section according to FIG. 3 studs 72 can be recognized in the central body 37, which extend—according to FIG. 2—from the end plate 43 right into the throttle housing 51 for releasably fastening the central body 37 to the throttle device 2.

On the side of the electric motor 9 an emergency actuating device 30 may be arranged optionally. Said device 30 is substantially formed by a pintail 32 pushed into the ready position 31 shown in FIG. 3 by means of a spring element. In the ready position 31 the pintail 32 is not engaged with the motor shaft 20 of the electric motor 9. The pintail 32 is guided in a bore 34 through an outer wall 35 of the housing shell 46 in a sealed manner. A receptacle 88 for the displaceable and rotatable accommodation of the pintail 32 is disposed in said bore. Towards the outside a housing 74 is slipped onto the receptacle 88, which encloses the pintail 32 at its outwardly protruding actuating end 36. A bore 75 for compensating the pressure is provided in the housing 74.

An end 33 of the pintail 32 facing the motor shaft is provided with pins 77 or other facilities which accommodate a correspondingly formed end of the motor shaft 22 in a positive manner or, respectively, which are brought into engagement with a blank 76 fastened at this end in a manner secured against rotation.

Figure 4:
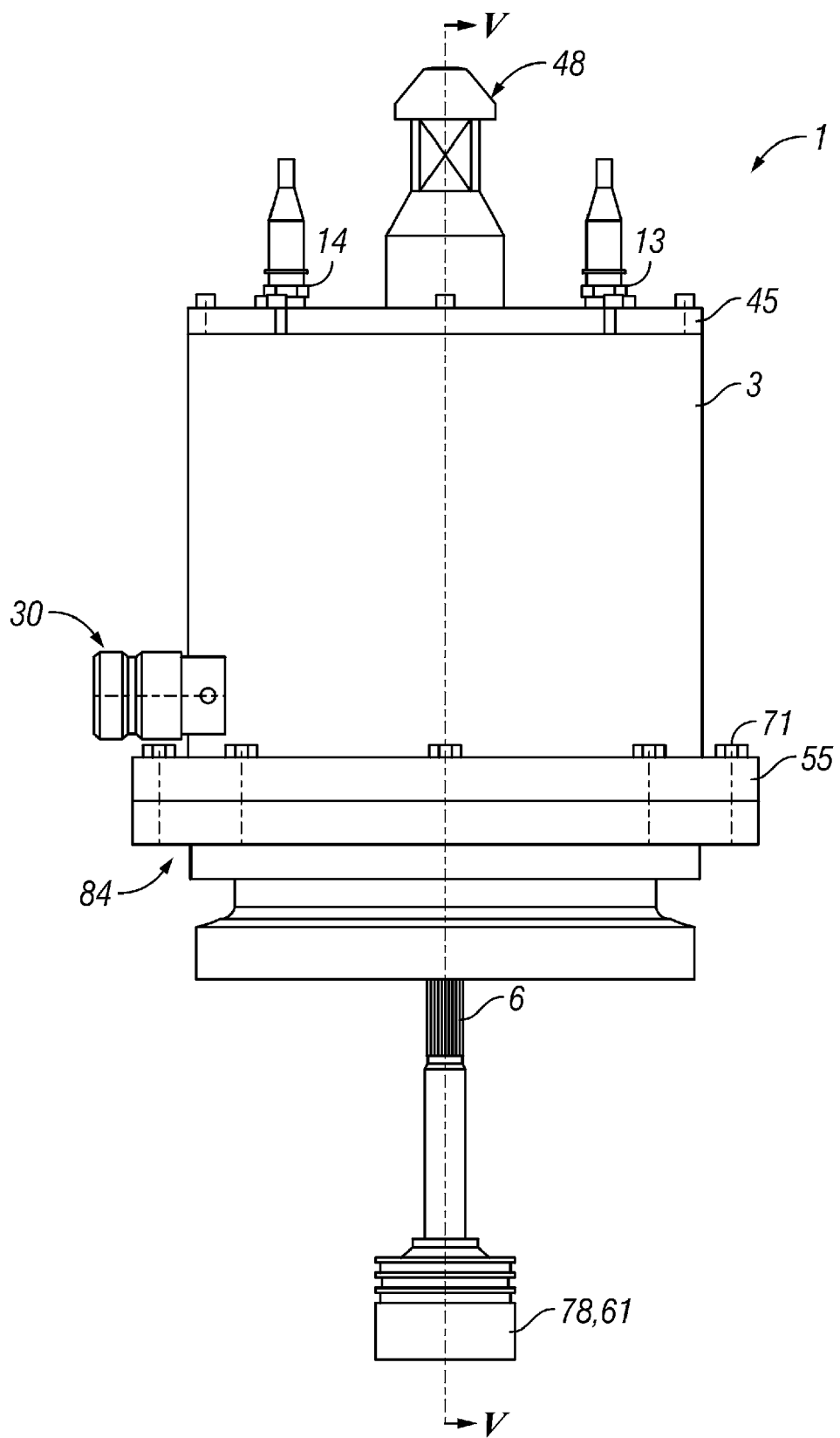
FIG. 4 shows a lateral view in analogy to FIG. 1 of a second embodiment of an actuating device according to the invention.

FIG. 4 shows a second exemplary embodiment of the actuating device 1 according to the invention. This substantially differs from the above-described embodiment by a connecting plate 84 fastened to the device housing 3 by means of a fastening ring 55, and by another throttle element 62—see particularly FIG. 5—at the free end 61 of the actuating element 6.

A throttle device 2 having a corresponding throttle housing 51 is not illustrated in FIG. 4.

FIG. 5 corresponds to a section along line V-V from FIG. 4.

For describing the actuating device 1 according to FIG. 5 more exactly, reference is particularly made to FIGS. 2 and 3, with FIG. 3 likewise corresponding to a section along line from FIG. 5. Only differences over the first exemplary embodiment will be explained in the following.

The connecting plate 84 serves to connect a non-illustrated throttle housing. Said housing comprises a passage bore 65 in the portion of the fluid inlet 59, see the dashed illustration in FIG. 2. The passage bore 65 in this case replaces the passage sleeve 63. According to the exemplary embodiment shown in FIG. 5 a sealing plug 66 as throttle element 62 is arranged at the free end 61 of the actuating element 6 instead of a corresponding throttle sleeve 64. For arranging said sealing plug 66, a throttle element receptacle 78 is disposed at the free end of the actuating element 6, in which the sealing plug 66 is releasably held.

In view of FIGS. 1 and 4 it is pointed out that the emergency actuating device 30 is illustrated in FIG. 4—see in this connection also the illustration according to FIG. 3—while it has been omitted in the exemplary embodiment according to FIG. 1. It is once more pointed out that such an emergency actuating device 30 is an optional feature.

The operating mode of the actuating device will hereinafter be briefly explained by means of the attached figures.

The actuating device 1 comprises an electric drive device formed by two servomotors 8, 9. Said servomotors 8, 9 are remotely controllable via corresponding connecting lines and their control devices 1, 12. When actuating one motor or both motors in synchronous operation, said motors drive the worm shaft 18 and thus the worm 16. Said worm 16 is engaged with the appertaining worm gear 17. The worm and the worm gear form a self-locking worm gear pair being locked at least oppositely to the feed direction of the turning spindle 4 in the direction of the throttle device. The self-locking state of the worm gear pair can only be released by applying a release torque from the servomotors 8, 9.

Especially in interaction with the roller thread as additional part of the transmission device 7 the worm gear pair easily results in a high gearing and allows the transmission of a high torque. The gearing can be selected, according to desire, by correspondingly selecting the worm, worm gear, thread nut and turning spindle.

When the thread nut 25 directly connected with the worm gear in a manner secured against rotation is rotated, the turning spindle 4 is correspondingly extended in the direction of the actuating device or is retracted in the opposite direction. Connected with the turning spindle 4 is the actuating element 6 at the free end of which a corresponding throttle element is disposed. The actuating element with the throttle element engage the throttle housing adjacent to the actuating device 1, where they serve to vary the fluid passage between the fluid inlet and the fluid outlet.

An emergency actuating device may be optionally associated with at least one of the servomotors, see FIGS. 3 and 4.

The invention claimed is:

1. An actuating device comprising:
   a device housing comprising a rotatably mounted turning spindle engaged with an actuating element;
   a drive device comprising at least two independently operable electric motors;
   a transmission device comprising at least one self-locking transmission unit operatively connecting the drive device and the turning spindle; and
   the actuating element being axially movable relative to the housing upon operation of the drive device.

2. An actuating device comprising:
   a device housing comprising:
      a central body comprising a bore therethrough;
      a rotating nut rotatably mounted in the central body;
      a spindle engaged with the nut and movable axially within the housing; and
      an actuating element engaged with the spindle;
   a drive device comprising at least two independently operable electric motors;
   a self-locking transmission device comprising:
      a worm on a worm shaft operatively engaged with the drive device; and
      a worm gear movable by the worm and engaged with the rotating nut;
   the drive device being able to provide rotation force to the rotating nut through the self-locking transmission device; and
   rotation of the rotating nut causing axial movement of the spindle and actuating element.

3. An actuating device for actuating a throttle device, comprising:
   a turning spindle rotatably mounted in a device housing and connected to an actuating element, the actuating element being actuated in the direction of the longitudinal axis of the turning spindle;
   a drive device comprising at least two independently operable electric motors located in separate motor openings in the device housing, the motor openings allowing access to the motors from outside the housing; and
   a transmission device comprising at least one self-locking transmission unit connecting the turning spindle with the electric motors, wherein the transmission unit comprises a worm on a worm shaft driven by the electric motors and also comprises a worm gear, wherein the transmission device also comprises a rotating nut that is disposed on the turning spindle and rotated by the worm gear, and wherein the turning spindle extends through both the worm gear and the rotating nut.

4. The actuating device according to claim 3, wherein the electric motors are servomotors or direct current servomotors.

5. The actuating device according to claim 3, wherein each electric motor is electrically connected with a separate control device.

6. The actuating device according to claim 5, wherein the device housing comprises an electrical connection for each electric motor.

7. The actuating device according to claim 1, wherein the electric motors are functionally connected with opposite shaft ends of the worm shaft.

8. The actuating device according to claim 7, wherein each electric motor is connected via its motor shaft with the respective worm shaft end in a manner secured against rotation.

9. The actuating device according to claim 7, wherein each worm shaft end extends into an electric motor and is arranged as motor shaft in manner secured against rotation.

10. The actuating device according to claim 9, wherein each worm shaft end is rotatably mounted in the device housing by means of ball bearings and/or roller bearings.

11. The actuating device according to claim 1, wherein the transmission device comprises a ball screw drive, the rotating nut comprises a ball nut, and the turning spindle comprises a recirculating ball screw.

12. The actuating device according to claim 1, wherein the transmission device comprises a roller thread drive, the rotating nut comprises a roller nut and the turning spindle comprises a recirculating roller spindle.

13. The actuating device according to claim 12, wherein the roller nut comprises a planetary roller thread.

14. The actuating device according to claim 1, wherein the rotating nut is arranged in a bearing sleeve rotatably, but axially undisplaceably mounted in the device housing.

15. The actuating device according to claim 14, wherein the bearing sleeve is mounted by at least one axial bearing in the device housing.

16. The actuating device according to claim 1, wherein the worm gear is arranged on one end of the rotating nut and is engaged with the worm.

17. The actuating device according to claim 1, wherein the worm gear is detachably fastened to the rotating nut.

18. The actuating device according to claim 1, wherein the worm gear is a globoid worm wheel.

19. The actuating device according to claim 1, wherein the worm is a cylindrical worm.

20. The actuating device according to claim 1, further comprising a manually actuated emergency actuating device operationally associated with at least one electric motor.

21. The actuating device according to claim 20, wherein the emergency actuating device comprises a pintail comprising an end facing the electric motor, the pintail being spring-loaded in a direction of a ready position and connectable with the motor shaft on the end facing the electric motor in a manner secured against rotation.

22. The actuating device according to claim 21, wherein the pintail further comprises an actuating end, the actuating end extending through a bore of an outer wall of the device housing in a sealed manner.

23. The actuating device according to claim 1, wherein the device housing comprises a central body comprising a central bore in which the rotating nut is mounted and along which the turning spindle extends.

24. The actuating device according to claim 23, wherein the central body comprises a motor opening for each motor, each motor opening open towards the outside in a radial direction, and a connection opening extending between the motor openings and substantially tangentially to the central bore for the arrangement of the worm shaft and the worm.

25. The actuating device according to claim 23, wherein the central body is releasably closed with an end plate on one of its ends.

26. The actuating device according to claim 25, wherein a position sensor is arranged in the end plate and operationally associated with one end of the turning spindle.

27. The actuating device according to claim 25, wherein the end plate comprises electrical ducts.

28. The actuating device according to claim 23, wherein the central body is substantially cylindrical and arranged in a housing shell releasably closable on one end by a cover plate.

29. The actuating device according to claim 28, wherein a lifting journal stands out from an outer side of the cover plate.

30. The actuating device according to claim 23, wherein the central body and the housing shell each comprise fastening ends adapted to detachably fasten to a throttle housing.

31. The actuating device according to claim 30, wherein the housing shell fastening end comprises a radially outwardly facing shoulder which can be gripped from behind by a shoulder radially inwardly protruding from a fastening ring.

32. The actuating device according to claim 1, wherein the throttle device comprises a throttle element bore extending into a throttle space, the throttle space connecting a fluid inlet and a fluid outlet in the throttle device, and wherein the actuating element extends from the device housing into the throttle device and can be moved in an actuating direction along the throttle element bore and into the throttle space.

33. The actuating device according to claim 32, wherein the actuating element further comprises a throttle element arranged on a free end of the actuating element, the throttle element being operable with the throttle device to vary the fluid passage through the throttle space.

34. The actuating device according to claim 33, wherein the throttle element comprises a throttle sleeve slipable onto a perforated passage sleeve.

35. The actuating device according to claim 34, wherein the throttle element comprises a sealing plug variably sealing a passage bore of the fluid inlet running into the throttle space.

36. The actuating device according to claim 1, wherein the turning spindle and the actuating element are coaxially arranged and are detachably connected with each other on their ends facing each other.

37. The actuating device according to claim 1, wherein the electric motors are synchronized by software.

38. The actuating device according to claim 37, wherein one electric motor is connected as master and any other electric motor is connected as slave or all motors are connected as master.

39. The actuating device according to claim 1, wherein the device housing is filled with oil.

40. The actuating device according to claim 1, wherein the transmission device comprises a thread nut drive, the rotating nut comprises a rotating thread nut, and the turning spindle comprises a threaded screw.

41. The actuating device according to claim 1, wherein the worm gear is integral with the rotating nut.

* * * * *